US006463693B1

(12) United States Patent
Weisner

(10) Patent No.: US 6,463,693 B1
(45) Date of Patent: Oct. 15, 2002

(54) WINDOWSILL INSECT TRAP

(76) Inventor: Steven William Weisner, P.O. Box 2115, Bethel, AK (US) 99559

( * ) Notice: Subject to any disclaimer, the term of this patent is extended or adjusted under 35 U.S.C. 154(b) by 151 days.

(21) Appl. No.: 09/224,245

(22) Filed: Dec. 30, 1998

(51) Int. Cl.[7] ............................................. A01M 1/24
(52) U.S. Cl. ...................................... 43/119; 43/132.1
(58) Field of Search ........................ 43/119, 107, 122, 43/132.1, 121

(56) References Cited

U.S. PATENT DOCUMENTS

| | | | | |
|---|---|---|---|---|
| 351,727 A | * | 10/1886 | Xevers | 43/119 |
| 1,015,141 A | * | 1/1912 | Crandall | 43/119 |
| 1,072,374 A | * | 9/1913 | Acree | 43/119 |
| 1,201,801 A | * | 10/1916 | Cargill | 43/119 |
| 1,373,650 A | * | 4/1921 | Carlson | 43/119 |
| 1,629,816 A | * | 5/1927 | Carlson | |
| 4,360,987 A | | 11/1982 | Lowder | |
| 4,557,069 A | | 12/1985 | Caldwell | |
| 4,638,592 A | | 1/1987 | Schneidmiller | |
| D313,264 S | | 12/1990 | Lauchland | |
| 5,172,513 A | * | 12/1992 | Reibling | 43/121 |
| D335,912 S | | 5/1993 | Brown | |
| 5,231,792 A | | 8/1993 | Warner | |
| 5,239,771 A | | 8/1993 | Beardsley | |
| 5,406,743 A | | 4/1995 | McSherry | |
| 5,490,349 A | | 2/1996 | Muramatsu | |
| 5,596,833 A | | 1/1997 | Harrie | |
| 5,915,948 A | * | 6/1999 | Kunze | 43/114 |

FOREIGN PATENT DOCUMENTS

| | | |
|---|---|---|
| DE | 165222 | 2/1950 |
| DE | 26 19 584 | 11/1977 |
| IT | 573132 | 2/1958 |
| JP | 5-76264 | 3/1993 |
| SU | 144340 | 2/1962 |

OTHER PUBLICATIONS

Cartoon from Washington Herald, "Jugging the Bees", Jan. 19, 1931.
"Novel Fly Traps for Tourists", in Mechanics and Handicraft, p. 69, May 1937.

* cited by examiner

Primary Examiner—Charles T. Jordan
(74) Attorney, Agent, or Firm—Oppedahl & Larson LLP

(57) ABSTRACT

This invention relates to an insect trap having a receptacle with a rear wall the top edge of which is thin. The trap is placed on a windowsill so the thin top edge of the rear wall lies flush against the window, providing a substantially smooth transition between the rear wall and the window. The receptacle is partially filled with a mixture of water and surfactant. In use, insects flying down the window travel over the thin top edge of the rear wall and continue down and fall into the water and drown.

18 Claims, 5 Drawing Sheets

WINDOWSILL INSECT TRAP

BACKGROUND OF THE INVENTION

1. Field of the Invention

This invention relates to insect traps and particularly to a trap for placement on windowsills inside a structure. More particularly, the invention relates to a trap for flying insects that does not require bait, but uses ambient light to attract insects and water to trap them.

2. Description of the Related Art

Various devices have been made to trap insects such as flies, moths and the like. Many of these traps require bait, often in the form of fermenting liquid. The odor of the fermenting liquid attracts the insects. Examples of such traps are described in U.S. Pat. Nos. 4,360,987, 4,557,069, 4,638,592, 5,231,792, 5,596,833, 5,490,349 and 5,406,743. Many of these traps are unacceptable for use inside structures because of the unpleasant odor of the bait. A fly trap not requiring bait and designed to attach to a window is described in U.S. Pat. No. 5,239,771. While not requiring bait, this trap is of complex design for preventing flies from escaping. Many of the prior art traps are relatively expensive to manufacture because of the complicated configuration required to lure the insects and prevent their escape.

Accordingly, there is a need for a simple, inexpensive insect trap that does not require bait and is suitable for use inside a structure, which will trap flying insects from within the surrounding area. It is an object of the present invention to provide such a trap.

SUMMARY OF THE INVENTION

The insect trap of the invention is designed to be used inside a structure such as a barn, shed, house, or other place where it is desired to eliminate flying insects. The trap is designed to be placed on a windowsill, adjacent the window, but can be placed in any location with a suitable flat surface.

In accordance with the instant invention, the insect trap comprises an open-top receptacle for holding a liquid in which the rear wall is flat and has a thin top edge so that when the trap is placed next to a window, the rear wall lies flush against the window. As used herein, the term "thin" means a thickness such that there is a substantially smooth transition from the window to the rear wall of the trap. At the lower limit, the edge could actually be sharp, although this is neither necessary nor desirable. Rather the edge need only be sufficiently thin that an insect walking on the window in the direction of the edge is not generally diverted in its path. In a preferred embodiment, the rear wall has a tapered edge at the top enabling the rear wall to lie flush against the window. In use, flies are attracted to the ambient light at the window and fly up and down the window in search of a way out. When the flies encounter the thin top edge of the rear wall of the trap, they continue down and fall into the water in the trap and drown. Preferably the rear wall of the trap extends upward from a plane defined by the top edge of the other walls and is formed of transparent material which simulates the window to decrease panic and allow insects to continue down into the water. The transparent material also increases the level of ambient light at the window. Supports made of suitable material may be attached to the bottom or rear of the trap for securing the trap to the window. A deodorizing solution may be added to the water to act as a general air freshener and to eliminate the odor of decomposing insects in the trap.

Various additional features can be included in further embodiments of the invention. One such feature is an insect trap designed to hold water in which baffles are situated inside the trap to prevent excessive water movement, especially during filing and emptying the trap.

Another feature of the invention is an insect trap in which a disposable liner is used to hold the water. The liner preferably has holes covered with a removable seal so that the water can be drained from the liner after use to allow easy disposal of the dead insects.

An additional feature of the invention is a method of trapping insects in which the trap is partially filled with water and surfactant and placed on a windowsill so that the rear of the trap is flush with the window. The surfactant reduces the surface tension of the water and prevents insect from walking across the water to escape.

DETAILED DESCRIPTION OF THE INVENTION

Figure 1:
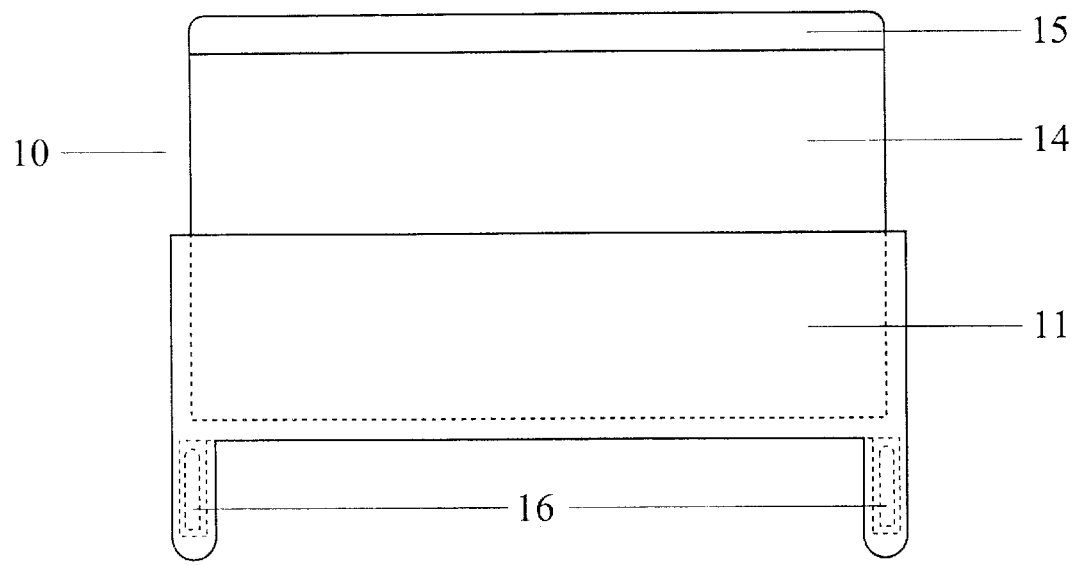
FIG. 1 is a front view of a preferred embodiment of the insect trap of the invention.
Figure 2:
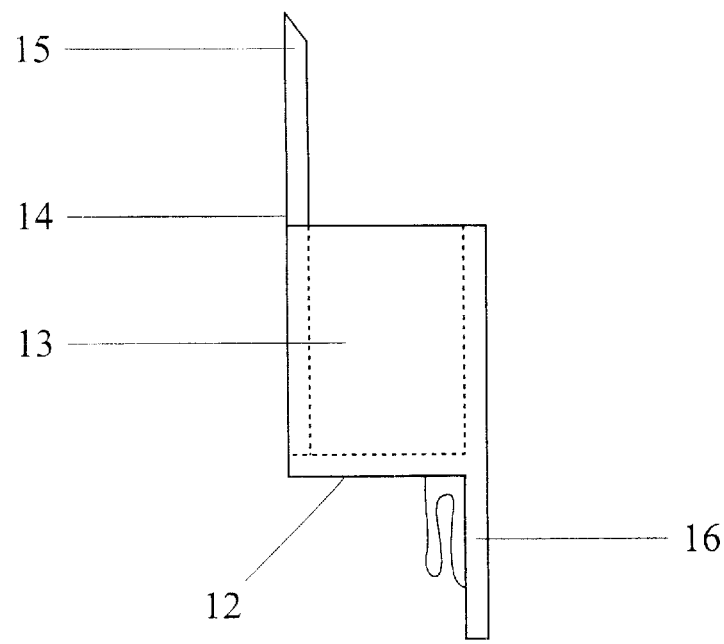
FIG. 2 is an end view of the insect trap of FIG. 1.
Figure 3:
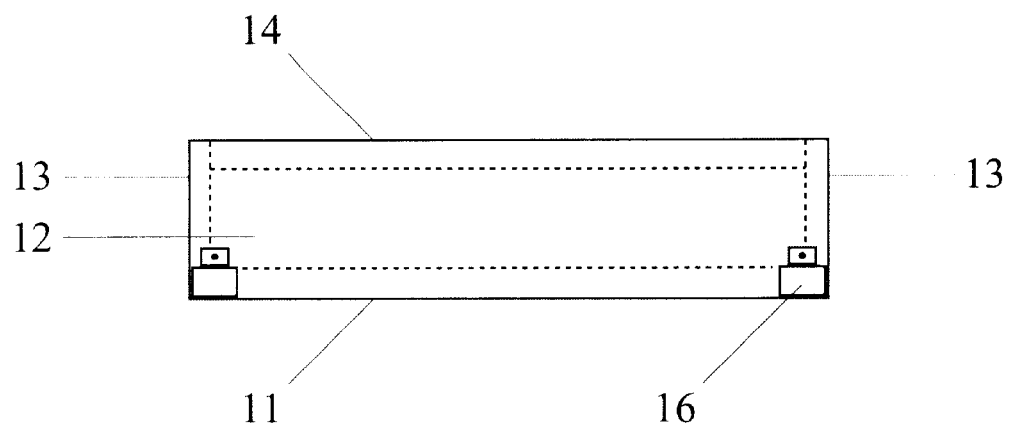
FIG. 3 is a bottom view of the insect trap of FIG. 1.
Figure 4:
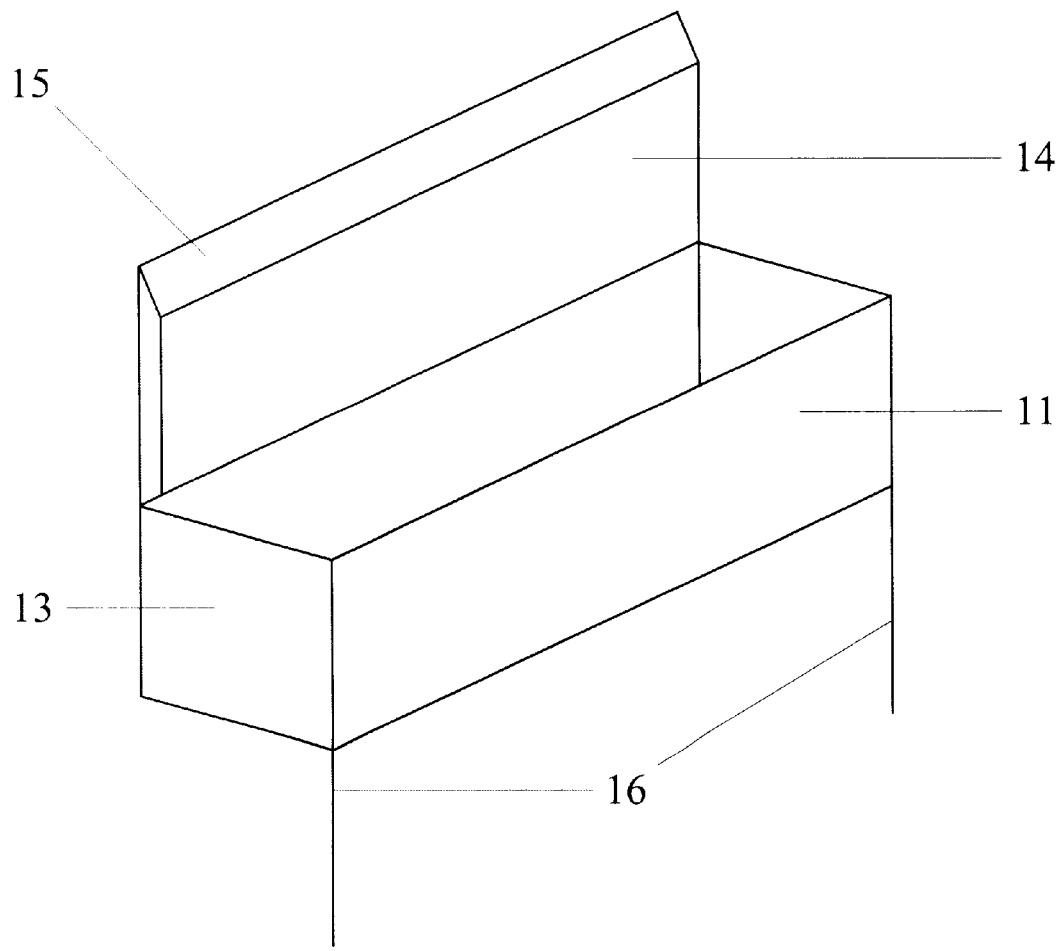
FIG. 4 is a perspective view of the insect trap of FIG. 1.
Figure 5:
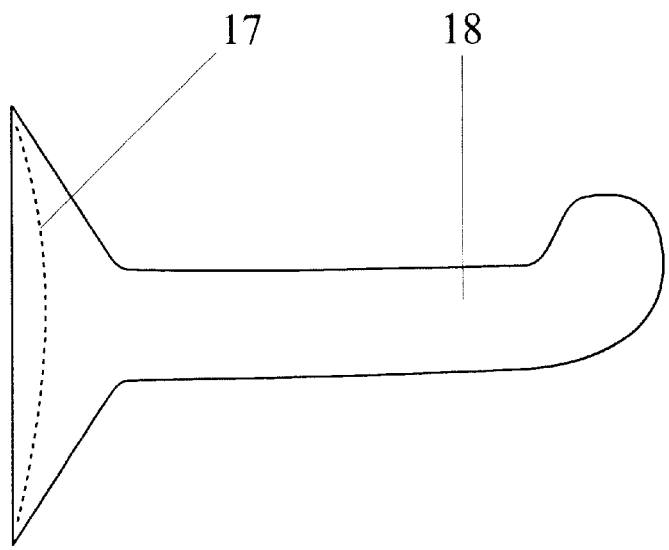
FIG. 5 is a side view of the suction cup attachment device.
Figure 6:
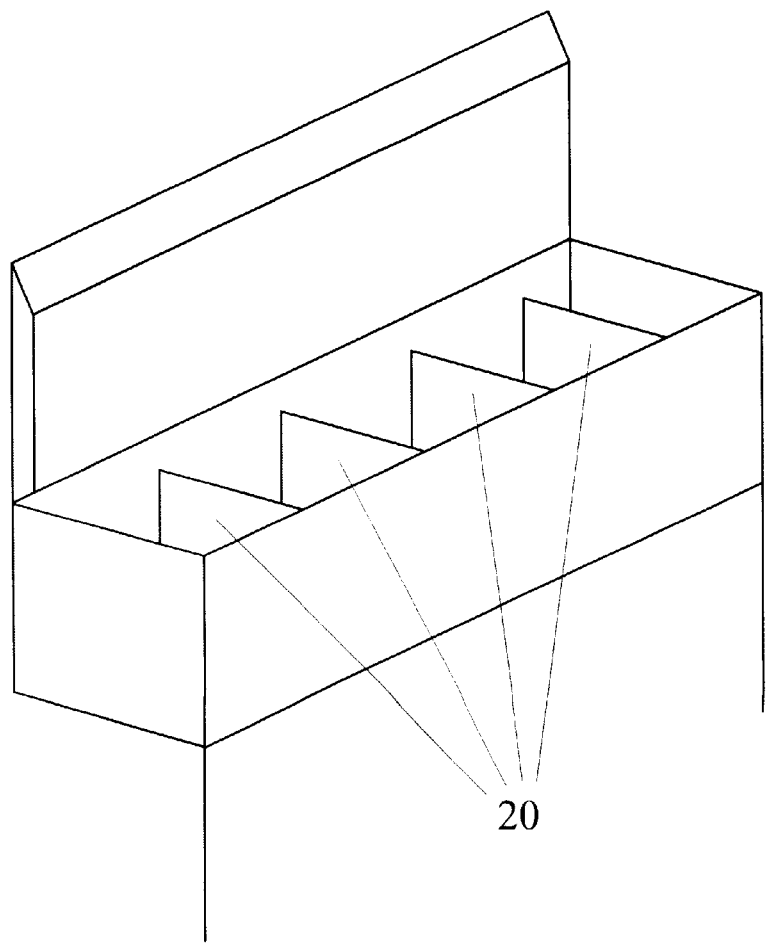
FIG. 6 is a perspective view of the insect trap with baffles in the receptacle.
Figure 7:
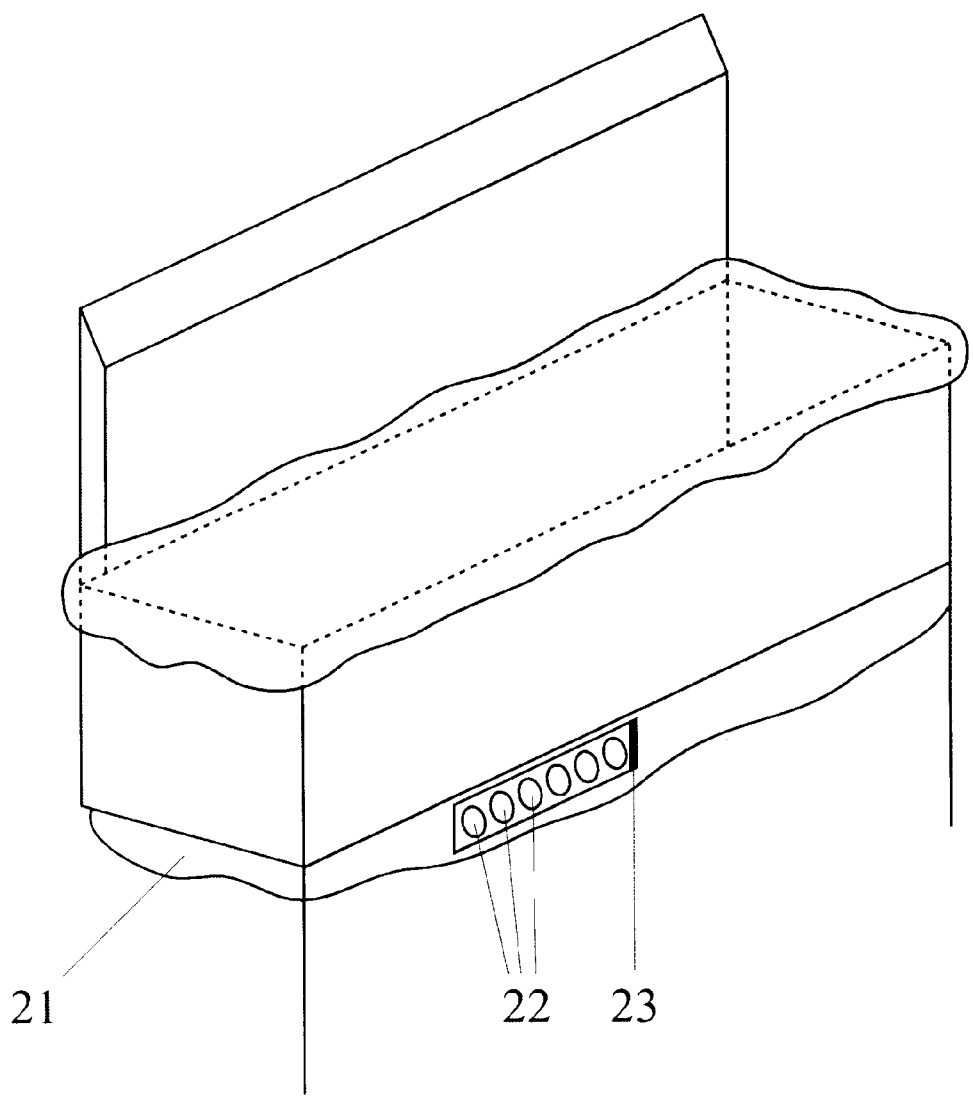
FIG. 7 is a perspective view of the insect trap with a disposable liner with holes covered by a removable seal.
Figure 8:
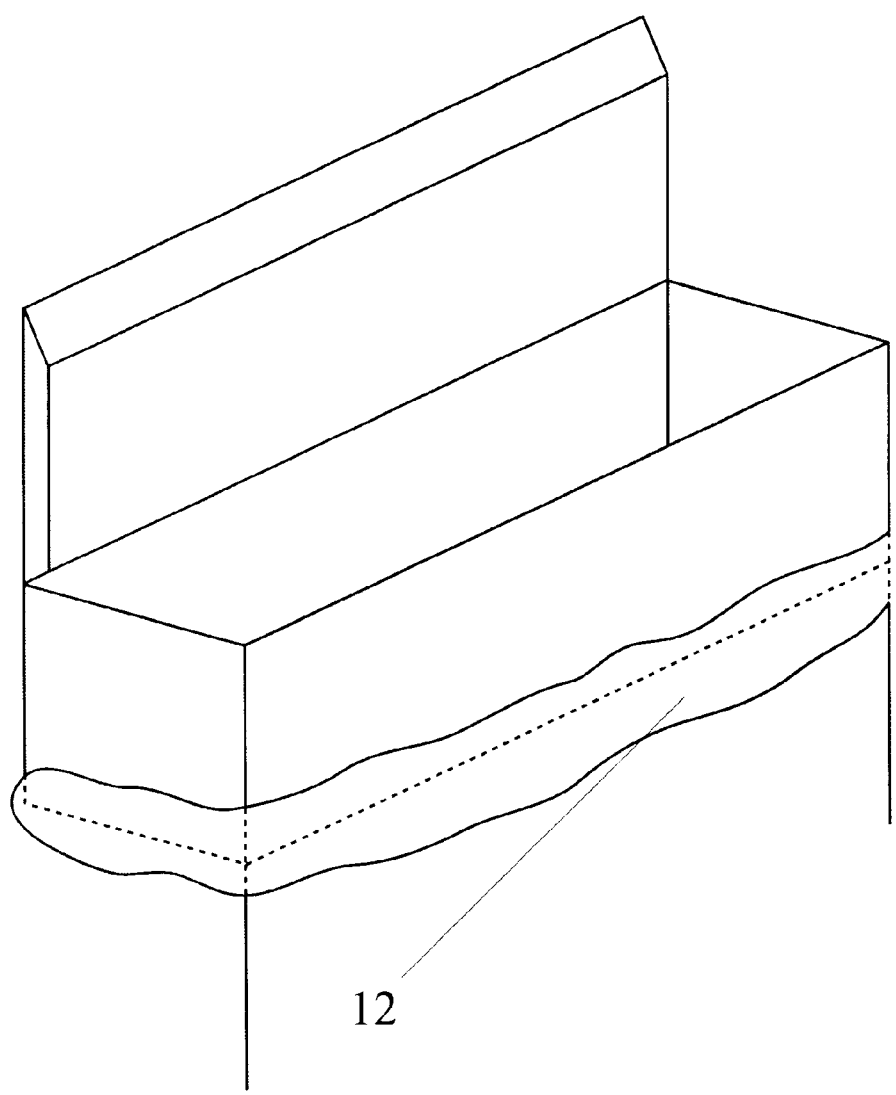
FIG. 8 is a perspective view of the insect trap with a flexible disposable bag as the bottom member.

A preferred embodiment of the insect trap 10 is shown in FIGS. 1–4 and consists of front 11, bottom 12, end 13 and rear 14 walls which define a water-tight receptacle with an open top. The rear wall 14 preferably extends above the front 11 and end 13 walls and has a thin top edge 15 which is preferably tapered to provide a substantially smooth transition between the rear wall and a flat surface, such as a window, against which the trap is placed. The phrase "thin top edge" is meant to mean that the top edge is narrower than what an insect, typically a fly, can land on and walk across, and generally is less than 1 mm. Preferably, the top edge is as narrow as possible to provide a smooth transition with the window, but is not sharp enough to cut.

Supports 16 attached to the bottom 12 wall near the front of the trap aid in maintaining the rear wall 14 with its thin top edge 15 in contact with the window. Alternatively, or in addition to the supports 16, suction cups 17 with arms 18 extending outward are used to affix the trap 10 to a window without a sill or other flat surface. The suction cups 17 are attached to the window and the trap 10 is placed on the arms 18.

Although pictured as a rectangle, the trap may be formed in any shape which creates a water-tight receptacle, open at the top, and with a flat rear wall. Thus, the trap may be a semi-circle, triangle, pentagon, hexagon, etc. The only restriction is that the trap must have at least one flat wall to rest flush with the window or other flat surface.

Preferably, the rear wall 14 of the trap is fabricated from a transparent material. The remaining parts of the trap may be colored to provide a pleasing appearance and to hide the dead insects. The trap is preferably formed of a plastic material which can be mass produced at low cost. Such a construction provides a durable device which can be easily cleaned.

A preferred embodiment of the insect trap has one or more baffles 20 extending upwards from the bottom inside the water-tight receptacle to prevent water from spilling when moving or emptying the trap. The baffles are preferably shorter than the walls to prevent insects from climbing out of the trap.

In a further embodiment of the insect trap, a light source is located at the bottom of the trap such that light shines upward, illuminating the rear wall of the trap, but does not shine outward away from the trap. This embodiment is particularly useful in conditions without ambient light at the window or when the ambient light at the window is not sufficient to attract insects.

In operation inside a dwelling, the trap 10 is placed on a windowsill with the rear wall 14 next to the window such that the thin top edge 15 forms a substantially smooth transition with the window. In the absence of a windowsill, the suction cups 17 are attached to the window, and the trap 10 is placed on the arms 18. A mixture of water and surfactant is placed in the trap.

The insect trap of the invention is based on the general knowledge that insects, especially flies, are attracted to light sources and therefore congregate on windows. Flying insects tend to move up and down on or adjacent to the window repeatedly. When an insect moving down the window encounters the thin top edge 15 of the trap, it continues down and falls into the water in the receptacle and drowns. The thin top edge of the trap resting flush with the window prevents insects from landing and walking along the top edge of the trap. Adding a surfactant, such as soap, to the water reduces the surface tension so the insects cannot walk across the water and escape.

In a further embodiment of the invention, a disposable liner 21 is placed inside the trap. The liner preferably has a plurality of holes 22 which are covered with a removable seal 23. The holes are small enough to retain insects such as files, while allowing the water to drain out after use. In use, the liner is placed into the receptacle of the trap, with the removable seal in place, and partially filled with water and surfactant. The trap is then placed on a windowsill with the rear wall flush with the window. After use, the liner is removed and the seal covering the holes is removed, allowing the water to drain out. The user then disposes of the liner and dead insects.

The insect trap of the invention does not require adhesive, bait, insecticides or attractants, though they can be used. Traps which require bait or attractants often draw insects to the area of the trap from other locations. This creates the undesirable effect of having more insects to trap, and if the trap is not 100% effective, the trap has added to the insect problem rather than solving it. The trap of the invention has the advantage of not requiring bait or attractants. The trap utilizes ambient light and an insect's natural tendency to gather on windows to trap those insects already present near the window. This trap works very well, is convenient and inexpensive to manufacture.

Although the preferred embodiment of the apparatus of the invention has been described above in some detail, it should be appreciated that a variety of embodiments will be readily apparent to one skilled in the art. The description of the apparatus of this invention is not intended to be limiting to this invention, but is merely illustrative of the preferred embodiment.

While the methods for trapping insects have been described in terms of preferred embodiments, it will be apparent to those skilled in the art that variations and modifications may be applied to the methods and in the steps or sequence of steps of the methods described herein without departing from the concept, spirit and scope of the invention.

I claim:

1. An insect trap comprising a receptacle for holding a liquid, said receptacle being formed by a wall member comprising a plurality of wall segments including at least one flat wall segment and a bottom member affixed to the wall member and said receptacle having an open top surface, said flat wall segment having a free top edge, said free top edge being less than 1 mm wide, and being tapered to provide a substantially smooth transition ramp between the flat wall segment and a flat surface against which the flat wall segment is disposed.

2. The insect trap of claim 1, wherein said flat wall segment extends above the other wall segments.

3. The insect trap of claim 1 further comprising one or more supports extending downward attached to the bottom member.

4. The insect trap of claim 1 further comprising means for attaching the trap to a flat surface.

5. The insect trap of claim 1 wherein said means comprises suction cups with arms extending outward on which the trap rests.

6. The insect trap of claim 1 further comprising a disposable liner situated in said receptacle for holding a liquid.

7. The insect trap of claim 6 wherein said liner has a plurality of holes covered by a removable seal.

8. The insect trap of claim 1 further comprising one or more baffles situated vertically in the receptacle, said baffles having a height less than that of the wall segments.

9. The insect trap of claim 1 wherein said bottom member is a flexible disposable bag.

10. An insect trap comprising a receptacle for holding a liquid, said receptacle being formed by a wall member comprising a plurality of wall segments including at least one flat wall segment and a bottom member affixed to the wall member and said receptacle having an open top surface, wherein said flat wall segment is transparent and extends above the other wall segments and has a free top edge, said free tog edge being less than 1 mm wide, and being tapered to provide a substantially smooth transition ramp between the flat wall segment and a flat surface against which the flat wall segment is disposed.

11. A method for trapping insects attracted to ambient light comprising placing a mixture of water and surfactant in a receptacle and placing the receptacle adjacent a window with the rear of the receptacle flush against the window, wherein the rear of the receptacle comprises a flat wall member having a top free edge along the inside, said free edge being less than 1 mm wide, and being tapered to provide a substantially smooth transition ramp between the flat wall member and the window when the receptacle is placed with the flat wall member adjacent the window, such that insects moving down the window encounter the tapered edge and continue down or fall into the water.

12. The method of claim 11 wherein the top free edge of the flat wall member is tapered.

13. The method of claim 11 wherein said flat wall member is transparent.

14. The method of claim 11 further comprising placing a disposable liner in the receptacle and placing the mixture of water and surfactant in the liner.

15. The method of claim 14 wherein said liner has a plurality of holes covered by a removable seal, and said method further comprises removing the liner from the receptacle after use and removing the seal to drain the water prior to disposal of the liner.

16. The method of claim 11 further comprising adding a deodorizing solution to the mixture of water and surfactant.

17. A system for trapping insects comprising a receptacle for holding a liquid and a window, said receptacle being formed by a wall member comprising a plurality of wall segments including at least one flat wall segment and a bottom member affixed to the wall member, said receptacle having an open top surface, said flat wall segment having a thin top edge less than 1 mm wide to provide a substantially smooth transition between the flat wall segment and the window against which the flat wall segment is disposed.

18. The system of claim 17 wherein the top edge of the flat wall segment is tapered.

* * * * *